United States Patent [19]

Fishbaugh et al.

[11] 4,342,716
[45] Aug. 3, 1982

[54] METHOD AND APPARATUS FOR MOLDING INDICIA IN ROTO-MOLDED PLASTIC CONTAINERS

[75] Inventors: Warren D. Fishbaugh, Rochester; W. Lawson Batty, Jr., Pittsford; Frank J. Freedman, Penfield, all of N.Y.

[73] Assignee: Sybron Corporation, Rochester, N.Y.

[21] Appl. No.: 912,030

[22] Filed: Jun. 2, 1978

[51] Int. Cl.³ .............................................. B29C 5/04
[52] U.S. Cl. .................................. 264/225; 264/310; 264/311; 264/316; 264/338
[58] Field of Search ............... 264/310, 311, 316, 338, 264/225, 226, 227; 425/183

[56] References Cited

U.S. PATENT DOCUMENTS 3,020,669  2/1962  Beyer-Olsen et al. ............... 264/310
3,077,005  2/1963  Sokol ................................... 264/338
3,303,246  2/1967  Forrest ................................. 264/225
3,550,197  12/1970  Szajna et al. ........................ 260/94
3,742,995  7/1973  Confer et al. ........................ 264/310
3,779,833  12/1973  Reppel ................................. 264/316

FOREIGN PATENT DOCUMENTS 2300128  7/1974  Fed. Rep. of Germany ...... 264/338

*Primary Examiner*—James H. Derrington
*Attorney, Agent, or Firm*—Theodore B. Roessel; Roger Aceto

[57] ABSTRACT

Disclosed is a method and apparatus for forming indicia on the outside of a roto-molded plastic container during the roto-molding process wherein a template bearing a mirror image of the indicia is removably affixed to the interior wall surface of a mold.

1 Claim, 4 Drawing Figures

METHOD AND APPARATUS FOR MOLDING INDICIA IN ROTO-MOLDED PLASTIC CONTAINERS

BACKGROUND OF THE INVENTION

The present invention relates to the roto-molding of plastic containers and more specifically to a method and apparatus for roto-molding wherein a message or other indicia can be molded directly into the outer surface of the plastic container.

Roto-molding is a well known process for manufacturing plastic containers. Briefly, in roto-molding a charge of powdered thermoforming resin, such as polyethylene, polypropylene or the like is placed into a hollow mold. The mold is then heated to temperatures which may range up to 700° F. depending upon the resin material. The mold is simultaneously rotated about two axes while it is being heated. This distributes the powdered resin over the entire interior surface of the mold and fuses the resin into a seamless homogeneous structure with a uniform wall thickness. The mold is then cooled, opened and the plastic container stripped from the interior of the mold.

Heretofore, when it was desired to form any indicia, such as liquid level lines, company names, or other appropriate messages into the side of the roto-molded plastic container, it was necessary to physically engrave a mirror image of the indicia into the wall of the mold. Thus, considerable time, effort and expense was required to change the mold in this fashion and consequently, the roto-molding of containers with indicia or other markings molded directly into the exterior of the container is seldom, if ever, undertaken.

The use of removable templates temporarily fixed to the interior surface of the roto-mold likewise has not heretofore proven successful. This is due in large measure to the problem of preventing the template from becoming detached from the side wall of the mold upon exposure for relatively long durations to the high temperatures involved in roto-molding, sometimes approaching 700° F. for periods of 10–15 minutes or more. Further, the air present in the space between the template and the side wall of the mold during the heating cycle expands and causes defects in the surface of the molded article on cooling.

The present invention, however, does provide a method and apparatus for modifying a roto-mold so as to permit the molding of indicia into the side of the roto-molded plastic container. In this respect, the invention involves in one aspect, the use of a metal template which has engraved on its surface a mirror image of the indicia to be molded into the side of the plastic container. This metal template is mechanically fastened to the interior surface of the roto-mold by screws, bolts or the like with a RTV (Room Temperature Vulcanizing) silicone rubber used as a caulking material to prevent the formation of bubbles in the plastic container due to air entering from around the template.

In another embodiment, the template itself, is cast in a silicone RTV rubber, the template then being attached to the mold using additional RTV silicone rubber as the adhesive agent. This latter method is preferred in that it does not destroy the integrity of the mold as compared to the mechanical technique defined above.

It is therefore the primary object of the invention to provide a method and apparatus for roto-molding messages into the outer surface of a plastic container without the need for engraving the indicia into the wall of the mold.

The invention will be better understood and additional objects thereof will become more apparent from the accompanying specification and claims considered together with the accompanying drawing.

DESCRIPTION OF THE PREFERRED EMBODIMENTS

Figure 1:
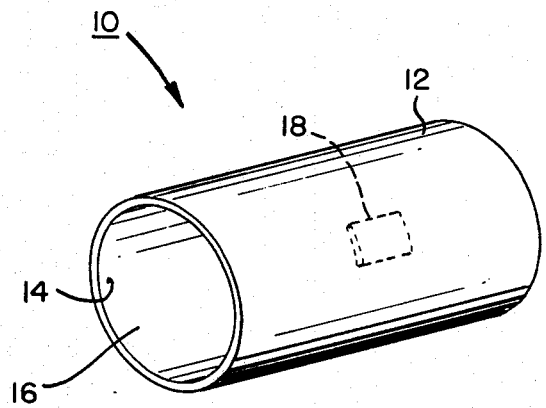
FIG. 1 is a perspective view of a roto-mold showing a template attached to the wall thereof in accordance with the present invention.

Referring the the drawings, FIG. 1 shows a roto-mold generally indicated at 10. The process of roto-molding plastic containers in well-known in the art. Briefly, the roto-mold consists of a metal shell 12, usually cylindrical having a smooth interior surface 14. The mold has an opening 16 at one end which can be sealed with a metal cover (not shown). In roto-molding a charge of thermoforming resin powder is placed into the mold and the mold is heated and rotated about two axes. This causes the powder to spread over the entire interior surface of the mold and fuse into a seamless homogeneous structure with a uniform wall thickness. After cooling the fused plastic article is stripped from the mold and another resin charge added.

In order to mold indicia into the plastic article, the smooth mold interior surface 14 must be provided with a mirror image of the indicia. Heretofore, one way of accomplishing this was to engrave the indicia directly into the surface of the mold. This, however, was not an acceptable practice as it required considerable time, effort and expense in order to change the indicia once it has been engraved directly into the mold surface. The present invention, however, eliminates the need for engraving the mold surface by providing for the attachment of a removable template 18 to the interior surface of the mold.

Heretofore, removable templates have not been widely used in roto-molding because of the problems involved in maintaining the template affixed to the mold during extended periods of successive uses of the mold. This is due to the relatively high temperatures to which the mold is exposed for extended periods of time that may run, for example, up to 700° F. for 10 to 15 minutes.

The present invention, however, provides embodiments wherein a template 18 fixed to the smooth interior surface 14 of the mold can easily be removed after molding.

Figure 2:
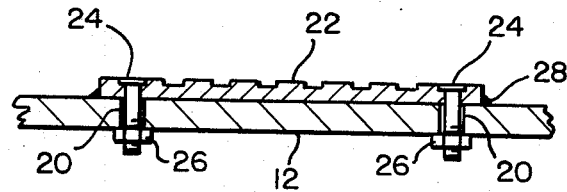
FIG. 2 is a sectional view on an enlarged scale of a portion of the roto-mold wall having mechanically fixed thereto a metal template in accordance with the present invention.

In one embodiment as shown in FIG. 2, two or more holes 20 are drilled through a section of the mold wall 12. Attached to this section of the wall is a template 22 made of a metal, preferably aluminum, and engraved with the mirror image of the indicia to be molded into the wall of the plastic container. Welded to the rear side of template 22 are two or more studs 24 corresponding to the drilled holes 20. Thus, the metal template can be attached to the mold wall simply by inserting studs through holes 20 and threading on nuts 26. A layer 28 of RTV-silicone 60 Rubber (Regd. TM of General Electric Co.) is then placed between metal template 22 and mold wall 12 along the periphery of template 22. This layer 28 placed in the liquid state will cure to form a resilient mass which seals completely the area beneath the template 22. This seal prevents any air transfer, which might otherwise occur during the heating and cooling cycles from air pockets which may be trapped beneath the template. If the air transfer occurs it is likely to cause bubbles or other defects in the molded product adjacent to the area of the template.

Figure 3:
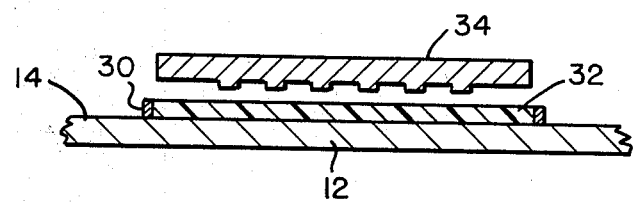
FIG. 3 is a sectional view of another embodiment of the invention wherein the RTV Silicone Rubber template is cast in situ on the interior surface of the mold wall.

In another embodiment of the invention, as shown in FIG. 3, the template material is cast in place directly on the smooth interior surface 14 of the mold wall 12. In this embodiment a small enclosed dam 30 of modeling clay or the like is built up on the smooth surface 14 of the mold. A liquid RTV silicone indicated at 32 is poured into the space surrounded by the dam. An impression plate 34 is then pressed down onto the liquid RTV silicone and kept there until the silicone has solidified. The impression plate 34 is then removed, leaving a mirror image of the impression on the surface of the silicone. The molding clay dam 30 is then removed and the edges of the silicone are trimmed. The cast RTV silicone rubber on curing adheres to the inside wall of the mold. After being used for molding containers the formed template 32 is then peeled from the smooth surface 14 of the mold.

Figure 4:
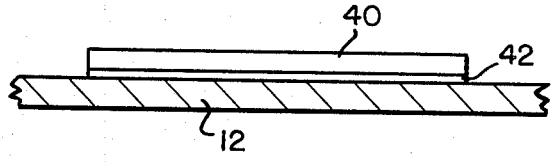
FIG. 4 is a view similar to FIG. 2 showing a silicone rubber template fixed to the wall of the roto-mold by an adhesive.

In still another embodiment of the invention, as shown in FIG. 4, a template 40 of either RTV or heat cured silicone is made outside of the roto-mold and then attached to the smooth inner surface 14 of the roto-mold using a layer 42 of RTV 60 silicone rubber (Regd. TM of General Electric Co.) as an adhesive.

Making the silicone template 40 from an RTV silicone is a relatively simple matter and involves only the fabrication of a suitable matrix board and then pouring the liquid RTV silicone into the matrix board. When the silicone is set, it is simply peeled from the matrix board as a pad and is a mirror image of the surface of the matrix board. Where the silicone template 40 is made from a heat cured silicone, a slightly more involved process is involved. In this respect, the heat curable silicone is placed in the matrix board and subjected to high pressure and temperature, as for example, pressure of 1,000 lbs per square inch at 350° F. These conditions are maintained for approximately 15 minutes to cure the silicone compound. Thereafter, the template is removed from the matrix board and subjected to a post cure heat treatment at 425° F. for about 3 to 4 hours. If desired, an additional post cure heat treatment can be accomplished by subjecting the template to about 550° F. for an additional 1 to 4 hours. These post cure heat treating cycles are carried out to insure that there is no shrinkage of the template during the actual roto-molding process.

The heat cured silicone template 40 is then affixed to the smooth surface 14 of the mold with an RTV silicone layer 42 being used as the adhesive. An empty cycle is first performed on the roto-mold wherein the mold is heated to approximately 525° F. for 10 to 15 minutes without resin. Thereafter, a conventional roto-molding process can be carried out wherein the powdered resin is introduced directly into the mold as set forth above.

A suitable adhesive used for the template should be heat resistant, have a low coefficient of expansion and be easily strippable from the mold wall, so that after molding one type of indicia on the containers the adhesive is stripped and the template easily removed. The inner wall of the mold can then be cleaned and a different template attached. The removed template may be preserved to be used again.

An example of such heat resistant, strippable and resilient on curing adhesive is a RTV silicone rubber. One such adhesive is RTV 60 (Reg'd TM of General Electric) silicone rubber which is a dimethyl siloxane compound cured with dibutyl tin dilaurate or tin octoate.

The template itself could be made out of a variety of materials: metal, a photoresist on a metal, silicone rubber (RTV or heat cured), or fluorocarbons. These are only a few examples of materials suitable as templates although the invention is not limited to these alone. In order for the material to be suitable for templates, it must have the following properties. It should be heat resistant at 750° F. for at least 15 minutes, be bondable to the inner wall of the mold, be resilient and non-sticking to the resin material being roto-molded.

In the preferred embodiment, the template is made out of a heat cured silicone rubber and affixed as a pad to the inner wall of the mold with RTV 60 a silicone adhesive (Registered TM of General Electric). This method is preferred in that it does not destroy the integrity of the mold due to mechanical damage.

Cured RTV 60 has the following typical properties.
sp. gr.: 1.47
Hardness Shore A: 60
Tensile Strength psi: 800
Elongation %: 130
Tear Resistance die B lb/in.: 40
Linear Shrinkage: 0.2–0.6
Coefficient of Thermal Expansion: $11.4 \times 10^{-5}$ The physical properties of heat cured silicone template are as follows:
Hardness Shore A: 50
Tensile Strength psi: 1000
Elongation %: 400
Tear Resistance die B lb/in: 65
Compressive Strength @
    22 hours 350° F.: 23%
    70 hours 300° F.: 21%

Though the specification describes molding indicia on the outside of a roto-molded container the process lends itself to molding indicia on the outside of any roto-molded article.

Thus, it should be appreciated that the invention does provide a method and apparatus for roto-molding specialized messages or other indicia directly into the walls of a roto-molded container and that this is accomplished without materially altering the integrity of the mold itself.

Having thus described the invention in detail, what is claimed as new is:

1. A method of rotomolding articles having indicia formed in the exterior wall thereof, comprising the steps of:
(a) forming a dam on the interior surface of a rotomold which encloses an area corresponding to the area on the article to be provided with the indicia;
(b) pouring a liquid room temperature vulcanizing silicone into the area surrounded by said dam;

(c) pressing an impression plate onto the surface of said liquid room temperature vulcanizing silicone and maintaining the position of said impression plate until RTV silicone has set;

(d) removing said dam and impression plate to leave a template which carries a mirror-image of the indicia to be molded adhering to the interior surface of the rotomold;

(e) placing a charge of thermo forming resin into the rotomold and heating the mold externally while rotating said mold to distribute and fuse said resin over the interior mold surface including said template thereby forming an article in which the exterior wall of the article has the mirror-image of said template surface molded directly therein; and thereafter (f) removing the article from said mold while retaining said template adhered to the interior mold surface.

* * * * *